US010911825B2

(12) United States Patent
Bhattacharya et al.

(10) Patent No.: US 10,911,825 B2
(45) Date of Patent: Feb. 2, 2021

(54) APPARATUS AND METHOD FOR DISPLAYING VIDEO AND COMMENTS (71) Applicant: NOKIA TECHNOLOGIES OY, Espoo (FI)

(72) Inventors: Sounak Bhattacharya, Tampere (FI); Lixin Fan, Tampere (FI); Yu You, Kangasala (FI); Tinghuai Wang, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/327,674

(22) PCT Filed: Aug. 15, 2017

(86) PCT No.: PCT/FI2017/050575
§ 371 (c)(1),
(2) Date: Feb. 22, 2019

(87) PCT Pub. No.: WO2018/037155
PCT Pub. Date: Mar. 1, 2018

(65) Prior Publication Data
US 2019/0200078 A1    Jun. 27, 2019

(30) Foreign Application Priority Data

Aug. 22, 2016    (EP) .................... 16185061

(51) Int. Cl.
*H04N 21/454*    (2011.01)
*G11B 27/34*    (2006.01)
(Continued)

(52) U.S. Cl.
CPC ......... *H04N 21/4542* (2013.01); *G06F 40/30* (2020.01); *G11B 27/031* (2013.01);
(Continued)

(58) Field of Classification Search
CPC .......... H04N 21/4542; H04N 21/4307; H04N 21/4532; H04N 21/4755; H04N 21/4756;
(Continued)

(56) References Cited

U.S. PATENT DOCUMENTS

2004/0021685 A1    2/2004    Denoue et al.
2004/0152054 A1    8/2004    Gleissner et al.
(Continued)

FOREIGN PATENT DOCUMENTS

CN    1742300 A    3/2006
CN    104811816 A    7/2015
(Continued)

OTHER PUBLICATIONS

International Search Report & Written Opinion dated Nov. 23, 2017 corresponding to International Patent Application No. PCT/FI2017/050575.
(Continued)

*Primary Examiner* — Thai Q Tran
*Assistant Examiner* — Nienru Yang
(74) *Attorney, Agent, or Firm* — Squire Patton Boggs (US) LLP (57) ABSTRACT An apparatus configured to, in respect of a video provided to a user and wherein a plurality of comments are displayed such that they scroll across the video, based on the comments and one or more comment filtering rules, provide for comment filtering as each of the plurality of comments scrolls to meet a filter line, wherein the filter line extends across at least part of the video to define a first area overlaying the video and a non-overlapping second area overlaying the video, such that in the first area the plurality of comments are provided for display scrolling therethrough towards the filter line prior to comment filtering and in the second area the plurality of comments are provided for
(Continued)

display with any comments of the plurality of comments that satisfy the one or more comment filtering rules removed from display.

20 Claims, 6 Drawing Sheets

(51) Int. Cl.
    *H04N 21/488*     (2011.01)
    *H04N 21/475*     (2011.01)
    *G11B 27/031*     (2006.01)
    *G11B 27/28*     (2006.01)
    *H04N 21/43*     (2011.01)
    *H04N 21/45*     (2011.01)
    *G06F 40/30*     (2020.01)

(52) U.S. Cl.
    CPC .............. *G11B 27/28* (2013.01); *G11B 27/34* (2013.01); *H04N 21/4307* (2013.01); *H04N 21/4532* (2013.01); *H04N 21/4755* (2013.01); *H04N 21/4756* (2013.01); *H04N 21/4882* (2013.01)

(58) Field of Classification Search
    CPC ... H04N 21/4882; G06F 40/30; G11B 27/031; G11B 27/28; G11B 27/34
    USPC ......................................................... 386/244
    See application file for complete search history.

(56) References Cited

U.S. PATENT DOCUMENTS

| | | | |
|---|---|---|---|
| 2009/0288112 | A1 | 11/2009 | Kandekar et al. |
| 2009/0297118 | A1 | 12/2009 | Fink et al. |
| 2010/0165396 | A1* | 7/2010 | Yamaguchi .......... H04N 21/454 358/1.15 |
| 2014/0280649 | A1* | 9/2014 | Soukka ................... H04L 51/24 709/206 |
| 2015/0304253 | A1* | 10/2015 | Lee ................... H04L 29/06476 709/206 |

FOREIGN PATENT DOCUMENTS

| | | |
|---|---|---|
| CN | 105027065 A | 11/2015 |
| CN | 105357586 A | 2/2016 |
| CN | 105723724 A | 6/2016 |
| JP | 2012175118 A | 9/2012 |

OTHER PUBLICATIONS

First Chinese Office Action issued in corresponding Chinese Patent Application No. 2017800515902 dated Apr. 9, 2020, with English translation thereof.

Notification of Second Office Action dated Oct. 12, 2020 corresponding to Chinese Patent Application No. 2017800515902, and English translation thereof.

* cited by examiner

901 — in respect of a video provided to a user, the video having a plurality of comments associated therewith and wherein the comments are displayed such that they overlay and scroll across the video, based on the plurality of comments and one or more comment filtering rules;

902 — providing for comment filtering as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering and in the second area the plurality of comments are provided for display with any comments of the plurality of comments that satisfy the one or more comment filtering rules removed from display.

APPARATUS AND METHOD FOR DISPLAYING VIDEO AND COMMENTS

TECHNICAL FIELD

The present disclosure relates to the field of virtual reality and, in particular, to the display of imagery of an object of interest to a second user that was viewed by a first user. Associated methods, computer programs and apparatus is also disclosed. Certain disclosed aspects/examples relate to portable electronic devices.

BACKGROUND

Videos may be commented on by a plurality of users watching the video. The comments of one or more users may be displayed overlaid the video when watched by a further user. It may be desirable to control the display of comments that are displayed such that they overlay and scroll across the video.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
 at least one processor; and
 at least one memory including computer program code,
 the at least one memory and the computer program code configured to, with the at least one processor, cause the apparatus to perform at least the following:
 in respect of a video provided to a user, the video having a plurality of comments associated therewith and wherein the comments are displayed such that they overlay and scroll across the video,
 based on the plurality of comments and one or more comment filtering rules;
 provide for comment filtering as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering and in the second area the plurality of comments are provided for display with any comments of the plurality of comments that satisfy the one or more comment filtering rules removed from display.

In one or more examples, this may be advantageous because in the first area unfiltered comments are visible and in the second area filtered comments are visible, which may provide for more intuitive control and visibility of the comment filtering. In one or more examples, this may be advantageous as the comments that are not removed due to the one or more filtering rules are provided for display with the appearance that they continue to scroll through the filter line from the first area into the second area.

In one or more embodiments, the filter line is movable by a user such that the particular point overlaying the video at which comment filtering is provided is user-modifiable.

In one or more examples, the filter line is moveable to an edge of the video such that only the second area of the first and second area is visible. In one or more examples, the filter line is moveable to an edge of the video such that only the first area of the first and second area is visible. In one or more examples, the filter line extends between opposed sides of the video. In one or more examples, the filter line is straight. In one or more examples, the filter line is oriented vertically with respect to the video. In one or more examples the filter line is oriented substantially perpendicular to a direction in which the comments scroll.

In one or more embodiments, the apparatus is caused to provide for display of a visible mark line marking the position of the filter line.

In one or more embodiments, the apparatus is caused to provide for removal of the display of the mark line after a predetermined period of time after a last user-interaction with said visible line.

In one or more examples, the user-interaction comprises one or more of moving the position of the filter line, selecting the filter line by way of a user input, hovering a graphical user interface pointer within a predetermined distance of the filter line.

In one or more embodiments, the apparatus is caused to provide for display of a user-movable selection marker, wherein movement of the selection marker is limited to at least two positions along an extent of the filter line, and wherein user-positioning of the selection marker such that at least part of at least one of the plurality of comments overlaps with the selection marker as the at least one comment scrolls towards the selection marker provides for user selection of said at least part of said comment for determination of the one or more filtering rules.

In one or more examples, the selection of at least part of the at least one comment provides for selection of the whole comment.

In one or more examples, the comments comprise a string of words and as each word overlaps with the selection marker as it scrolls towards it, the word is selected.

In one or more embodiments, the apparatus is caused to provide for a reduction of a speed at which the comments scroll in a predefined focus area, the predefined focus area extending from the filter line into the first area around the selection marker, the focus area having a width, the width extending in the direction of the filter line, less than the length of the filter line to thereby provide for localised slowing of scrolling comments approaching the selection marker.

In one or more embodiments, the apparatus is caused to provide for addition of comment filtering rules based on one or more of;
 i) keyword filtering wherein at least one or more words present in the at least part of a comment selected by the user selection is used to define a comment filtering rule such that future comments containing said at least one or more words are filtered on meeting the filter line;
 ii) commenting-user filtering wherein each comment is associated with a user account of a user who posted the comment, and wherein a user account of the user who posted the comment selected by the user selection is used to define a comment filtering rule such that future comments posted using the same user account are filtered on meeting the filter line;
 iii) semantic filtering wherein at least one or more words present in the at least part of a comment selected by the user selection is used to define a comment filtering rule such that future comments containing the same meaning, determined by semantic analysis of the at least one or more words, are filtered on meeting the filter line;

iv) regular expression filtering wherein at least one or more words present in the at least part of a comment comprising an expression used to define a comment filtering rule such that future comments identified by regular expression analysis using the expression are filtered on meeting the filter line.

In one or more embodiments, the apparatus is caused to provide for receipt of user input of an expression, the expression forming part of a comment filtering rule such that future comments identified by regular expression analysis using the expression are filtered on meeting the filter line.

In one or more embodiments, the apparatus provides for a plurality of filtering modes and wherein based on a current filtering mode, at least the mark line is displayed with an appearance unique to the current filtering mode relative to the plurality of filtering modes.

In one or more embodiments, the apparatus provides for a plurality of filtering modes and wherein based on a current filtering mode, at least a mode selection graphic is provided for display to provide feedback of the selection of the current filtering mode and the non-selection of the other of the plurality of filtering modes.

In one or more embodiments, the filtering modes comprise one or more of;
i) keyword filtering mode in which at least one or more selected words define a comment filtering rule such that future comments containing said at least one or more words are filtered on meeting the filter line;
ii) commenting-user filtering mode in which each comment is associated with a user account of a user who posted the comment, and wherein a user account of the user who posted the comment selected by the user selection is used to define a comment filtering rule such that future comments posted using the same user account are filtered on meeting the filter line;
iii) semantic filtering in which at least one or more words present in the at least part of a comment selected by the user selection is used to define a comment filtering rule such that future comments containing the same meaning, determined by semantic analysis of the at least one or more words, are filtered on meeting the filter line;
iv) regular expression filtering mode in which based on receipt of user input of an expression, the expression forms part of a comment filtering rule such that future comments identified by regular expression analysis using the expression are filtered on meeting the filter line.

In one or more embodiments, the apparatus is caused to provide said comment filtering with a plurality of sensitivities, said sensitivities affecting the degree to which the one or more filtering rules are applied, and wherein the apparatus is caused to provide for feedback to a user on a current sensitivity of the plurality of sensitivities relative to the remaining plurality of sensitivities by virtue of the width of the mark line.

In one or more embodiments, the apparatus is caused to provide for control of the sensitivity by way of a user input comprising a pinch/expand gesture received via a multi-touch input interface.

In one or more embodiments, the apparatus is caused to provide for further filtering of non-filtered comments comprising those that do not satisfy the one or more comment filtering rules and would not be removed from display in accordance with the one or more filtering rules, wherein the further filtering is based on a user-specified proportion of the comments, the user-specified proportion providing for one or more of;
i) random selection of a subset of the non-filtered comments in accordance with the user-specified proportion;
ii) selection of a consecutive set of the non-filtered comments in accordance with the user-specified proportion, the non-filtered comments ranked according to predefined criteria.

In a further aspect there is provided a method, the method comprising
in respect of a video provided to a user, the video having a plurality of comments associated therewith and wherein the comments are displayed such that they overlay and scroll across the video,
based on the plurality of comments and one or more comment filtering rules;
providing for comment filtering as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering and in the second area the plurality of comments are provided for display with any comments of the plurality of comments that satisfy the one or more comment filtering rules removed from display.

In a further aspect there is provided a computer readable medium comprising computer program code stored thereon, the computer readable medium and computer program code being configured to, when run on at least one processor, perform the method of:
in respect of a video provided to a user, the video having a plurality of comments associated therewith and wherein the comments are displayed such that they overlay and scroll across the video,
based on the plurality of comments and one or more comment filtering rules;
providing for comment filtering as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering and in the second area the plurality of comments are provided for display with any comments of the plurality of comments that satisfy the one or more comment filtering rules removed from display.

In a further aspect there is provided an apparatus, the apparatus comprising means configured to;
in respect of a video provided to a user, the video having a plurality of comments associated therewith and wherein the comments are displayed such that they overlay and scroll across the video,
based on the plurality of comments and one or more comment filtering rules;
provide for comment filtering as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering and in the second area the plurality of comments are provided for display with any comments of the plurality of comments that satisfy the one or more comment filtering rules removed from display.

The present disclosure includes one or more corresponding aspects, examples or features in isolation and in various combinations whether or not specifically stated (including claimed) in that combination or in isolation. Corresponding means and corresponding functional units (e.g., function enabler, regular expression searcher, keyword searcher, user account identifier, display device, semantic analyser) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
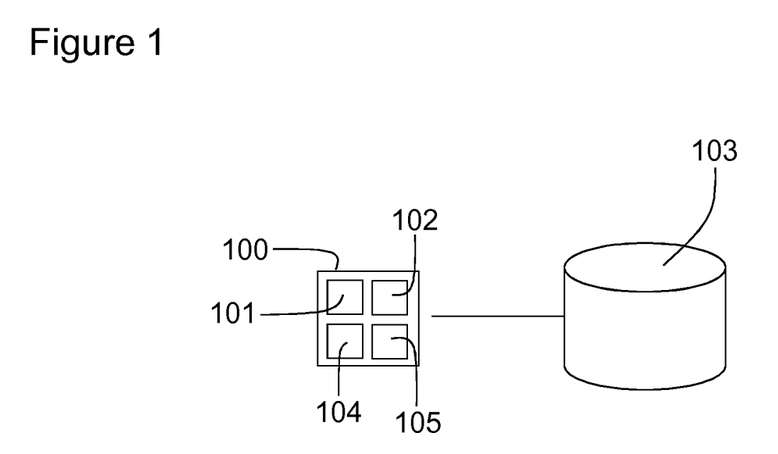
FIG. 1 illustrates an example apparatus configured to provide for comment filtering.

FIG. 1 shows an example apparatus 100 which is configured to provide for comment filtering. The apparatus 100 may comprise a computer, mobile phone or laptop among others, as listed below. The apparatus 100 may include functionality or may be associated with other apparatus that provides functionality to provide for display of a video to a user, the video having a plurality of comments associated therewith and wherein the comments are displayed such that they overlay and scroll across the video. The video and the associated comments may be stored locally to the apparatus in a memory store 103 or may be received from a server (not shown) with which the apparatus 100 or further apparatus is in communication, such as via the Internet.

With reference to FIG. 1, the apparatus 100 comprising at least one processor 101 and at least one memory 102 including computer program code, the at least one memory 102 and the computer program code configured to, with the at least one processor 101, cause the apparatus to perform comment filtering, as described below.

In this embodiment the apparatus 100 mentioned above may have only one processor 101 and one memory 102 but it will be appreciated that other embodiments may utilise more than one processor and/or more than one memory (e.g. same or different processor/memory types). Further, the apparatus 100 may be an Application Specific Integrated Circuit (ASIC).

An input 104 allows for receipt of signalling to the apparatus 100 from further components, such as components of an electronic device (like a touch-sensitive or hover-sensitive display) or the like. The output 105 allows for onward provision of signalling from within the apparatus 100 to further components such as a display screen, speaker, or vibration module. In this embodiment the input 104 and output 105 are part of a connection bus that allows for connection of the apparatus 100 to further components.

The processor may be a general purpose processor dedicated to executing/processing information received from other components, such as from content store 103, and in accordance with instructions stored in the form of computer program code in the memory. The output signalling generated by such operations of the processor is provided onwards to further components, such as to a display device for display of the filtered comments. Input signalling may be provided for such operations of the processor, such as user input to define comment filtering rules or for manipulation of a user interface by a user.

The memory 102 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

Figure 2:
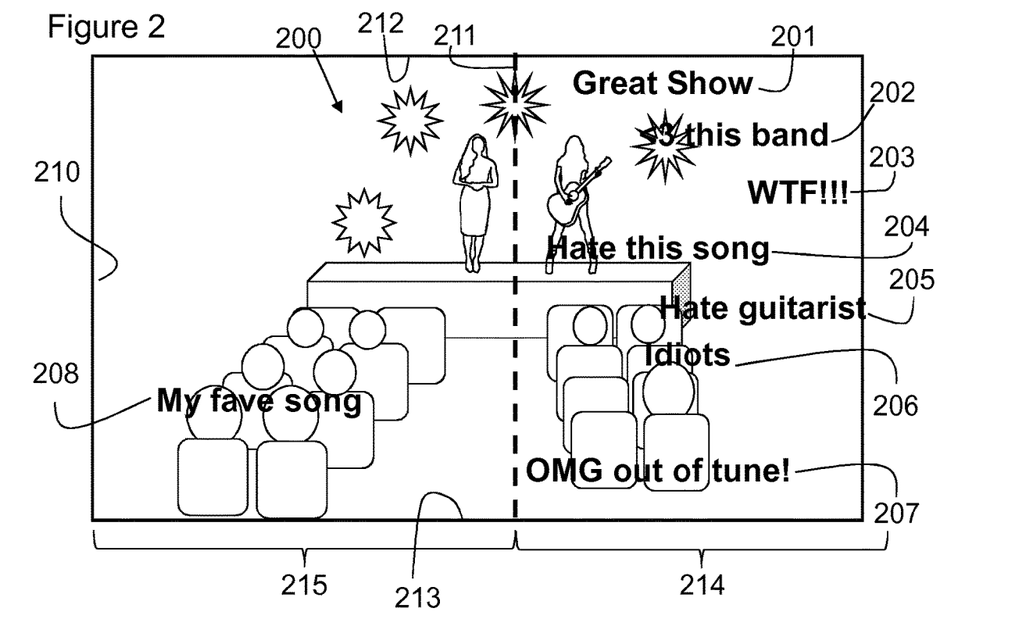
FIG. 2 illustrates a video provided to a user, the video having a plurality of comments displayed such that they overlay and scroll across the video, at a first time.
Figure 3:
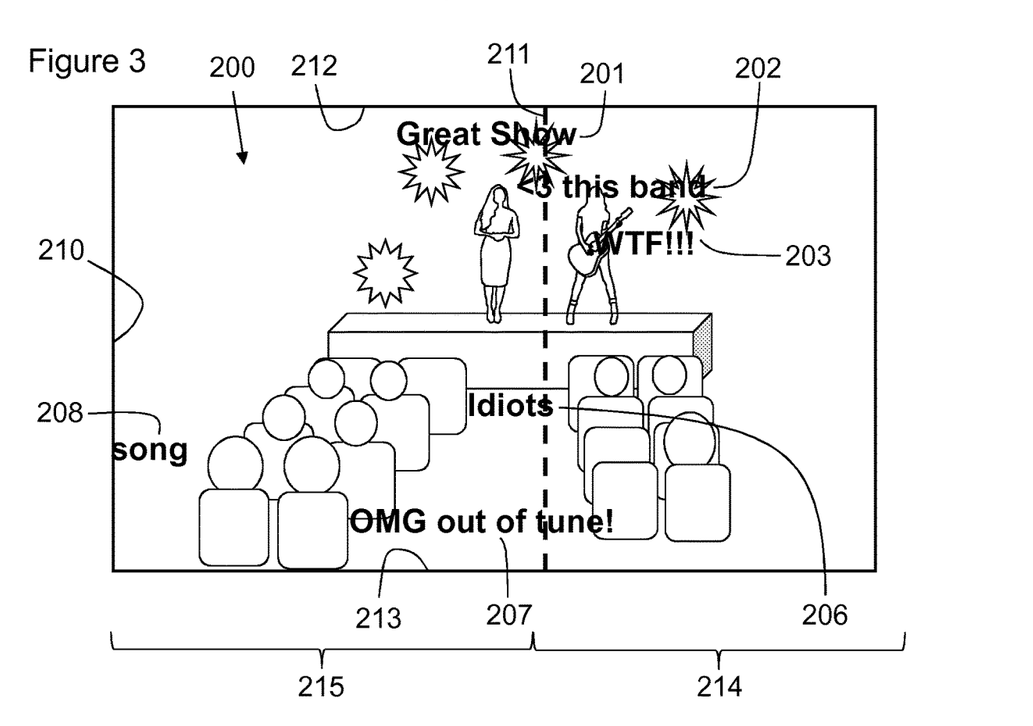
FIG. 3 illustrates the display of the video of FIG. 2 at a later time.

FIG. 2 shows a display of a video 200 at a first time and FIG. 3 shows the display of the same video 200 at a later time. The video 200 is provided for display with a plurality of comments 201, 202, 203, 204, 205, 206, 207, 208 that may have been made by one or more users while watching the video 200. The comments 201-208 are displayed such that they overlay the video 200 and scroll across the video 200. Thus, comparing the position of the comments 201-208 in FIGS. 2 and 3, it can be seen that the comments 201-208 have scrolled across the video from right to left. In one or more examples, the comments may scroll across in any other direction, including left to right, top to bottom or bottom to top or diagonally. An eighth comment 208 of the plurality of comments has reached an edge 210 of the spatial extent of the video 200 and is progressively removed from display as it scrolls off the video. Thus, the spatial extent of the video 200 may be considered to be a window through which a user views the scrolling comments. In one or more examples, the comments may scroll over an area larger or smaller than the area of the video.

The apparatus 100 is caused to, based on one or more comment filtering rules, provide for comment filtering as each of the plurality of comments 201-208 scrolls to meet a particular point overlaying the video defined by a filter line 211. The filter line 211 may be a line presented to a user as a visible line or may be invisible (although its location may be inferred from where on the video the filtered comments are removed from display). In one or more examples, the filter line may be presented as visible when a user interacts with the filter line 211 and optionally for a predetermined time after said interaction before becoming invisible. Interaction may include one or more of a touch input or other selection input at the location of the filter line 211 or the pointing of a pointer at least in the vicinity of the filter line 211. As shown in FIG. 3, comments 204 and 205 have been filtered by removal from display when they scrolled to reach the filter line 211. Thus, comments 204 and 205 are not visible in FIG. 3.

The filter line 211 extends across the video 200 from one side comprising the upper extent 212 of the spatial extent of the video to an opposed side of the video comprising the lower extent 213 of the spatial extent of the video. In this example the comments are provided for display such that they scroll over any part of the video. However, it will be appreciated that in one or more examples, the area over which comments are provided for display and scrolled may be a sub-area of the spatial extent of the video thereby comprising an area smaller than the spatial extent of the video. In such one or more examples, the filter line 211 may extend across the sub-area.

The filter line 211 thereby defines a first area 214 overlaying the video and a non-overlapping second area 215 overlaying the video, such that in the first area 214 the plurality of comments are provided for display scrolling therethrough towards the filter line 211 prior to comment filtering. In the second area 215, the plurality of comments 201-208 are provided for display with any comments of the plurality of comments that satisfy the one or more comment filtering rules removed from display, e.g. comments 204 and 205. Thus, comments that are not filtered are provided for display as if they pass through the filter line and continue scrolling while comments that are filtered are removed from display at the filter line. The removal from display of the comment may occur for the whole comment as soon as part of it touches the filter line, or it may be progressively removed from display as each part of the comment scrolls to meet the filter line. The removal from display may be accompanied by a fading visual effect or other animated effect to provide the appearance of the comment being erased or made invisible by the filter line.

In one or more examples, this may be advantageous because in the first area 214 unfiltered comments are visible and in the second area 215 filtered comments are visible i.e. a subset of the comments that scrolled through the first area 214 excluding those that fall foul of the filtering rules, which may provide for more intuitive control and visibility of the comment filtering. The apparatus 100 thus provides visual feedback to a user on which comments are filtered due to the filtering rules in a display area space efficient manner.

Figure 4:
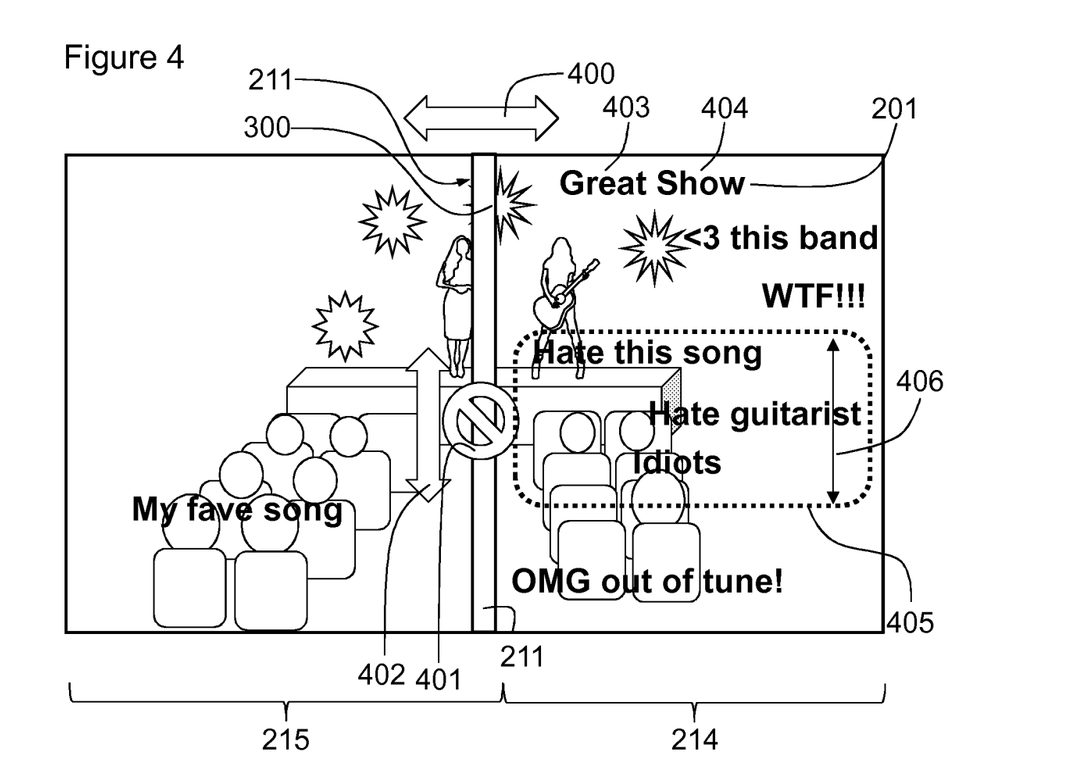
FIG. 4 illustrates a filter line extending across the video along with a selection marker.

FIG. 4 shows the filter line 211 in a visible form, shown as a bar 300. FIG. 4 shows the filter line 211 as movable by a user, designated by the arrow 400. The filter line 211 is slidable from left to right in this example, i.e. perpendicular to the extent of the filter line. Thus, the particular point at which the filter line overlays the video 200 and therefore at which point comment filtering and the removal of comments is provided is user-modifiable. The movement of the filter line 211 thus affects the size of the first area 214 and the size of the second area 215. Accordingly, when positioned on the right hand side of the video 200, the first area 214 is smaller than the second area 215 and the apparatus provides, over a larger spatial extent of the video, comments that have been subject to filtering. When the filter line 211 is positioned on the left hand side of the video 200, the first area 214 is larger than the second area 215 and the apparatus provides, over a larger spatial extent of the video, comments that have not been subject to filtering. This may be advantageous as with a limited display area and potentially many comments to display, the user-moveable filter line provides for easy viewing of filtered and unfiltered comments. Further, particularly for display screens of mobile phones or other small screens it is preferable to show the video full screen, this leaves no room available for control or user-review of comment filtering. The filter line 211 and further, when it is movable, may, in one or more examples, provide for advantageous use of limited display area. In one or more examples, the filter line is moveable to an edge of the video such that only the second area or only the first area of the first and second area is visible overlaying the video 200.

In the examples above, the filter line 211 is a straight line extending across the video. In one or more examples the filter line 211 may extend across at least part of the video but may not be straight. For example, it may be curved or of two or more curved or linear sections. Further, in the above example, the filter line is oriented substantially perpendicular to a direction in which the comments scroll but this need not be the case provided that filter line may be positioned by the user such that the comments being filtered on incidence with the filter line is appreciable.

FIG. 4 also illustrates a selection marker 401 provided for use by the user in selecting comments or parts thereof approaching the filter line 211. The selection of the comments or parts thereof may be used to define comment filtering rules.

In this example, the selection marker 401 is user-movable. In one or more examples, the possible user movement of the selection marker 401 is limited to being slidable along the filter line 211. Given the selection marker 401 is provided for selection of comments or parts thereof, the positions adoptable by the selection marker 401 along the filter line 211 may be dependent upon the positions at which comments are provided for display relative to the filter line 211, such that the selection marker 401 can be moved to select the comments or parts thereof. Thus, the movement of the selection marker may be limited to at least two positions along an extent of the filter line. In one or more examples, the selection marker 401 may be freely movable along the extent of the filter line 211. In one or more examples, movement of the selection marker 401 and the filter line 211 can or cannot be performed in a single movement action. Thus, based on user-selection of the selection marker, the apparatus may maintain the filter line in its current position and allow movement of the selection marker to positions along the filter line. In one or more examples, based on user-selection of the selection marker, the apparatus may allow movement of the filter line to different points overlaying the video as well as allowing for movement of the selection marker to positions along the filter line. Arrow 402 demonstrates the apparatus 100 providing for display of the user-slidable selection marker 401.

As mentioned above the selection marker 401 may be provided for selection of comments 201-208 or parts thereof. The apparatus 100 may be caused to determine a spatial coincidence or overlap between the user-positioned selection marker 401 and at least one of the comments 201-208 or parts thereof and, based on said spatial coincidence, provide for selection of the spatially coincided comment 201-208 or part thereof. Once selected, the apparatus 100 may provide for generation of a comment filtering rule based on the selected comment 201-208 or part thereof, as will be described in more detail below. Thus, the apparatus 100 is configured such that when at least part of at least one of the plurality of comments 201-208 overlaps with the selection marker 401 as the at least one comment scrolls towards the selection marker 401, the comment or a part thereof is selected for determination of the one or more filtering rules.

The apparatus 100 may be caused to select one or more of;
- a whole comment based on determination of a spatial coincidence or overlap between the user-positioned selection marker 401 and a part of the comment;
- a whole comment based on determination of a spatial coincidence or overlap between the user-positioned selection marker 401 and the whole comment as it scrolls towards the selection marker;
- a part of the comment based on determination of a spatial coincidence or overlap between the user-positioned selection marker 401 and the part of the comment;
- a whole or part of the comment based on determination of a spatial coincidence or overlap between the user-positioned selection marker 401 and the whole or part of the comment when the selection marker is substantially stationary (e.g. stationary or moving below a threshold speed).

Providing for selection of a part of the comment may be advantageous. For example, in one or more examples, the comments comprise a string of words (e.g. the words "Great" 403 and "Show" 404 in comment 201) and as each word 403, 404 overlaps with the selection marker 401 as it scrolls towards it, the word is selected. Thus, in one or more examples, the user may happen to select an offensive word from one of the comments, which may form the basis of future filtering by way of the apparatus providing for generation of a comment filtering rule.

In one or more examples, the scrolling comments may be difficult or bothersome to accurately select due to their movement. FIG. 4 shows the apparatus 100 providing for slowing of a scrolling speed of one or more of the plurality of comments provided for display in a localised area extending from the current location of the selection marker 401. The localised area comprising a predefined focus area 405 extends from the filter line 211 into the first area 214 around the selection marker 211. The focus area 405 has a height 406, the height 406 extending in the direction of the filter line 211, which is less than a length of the filter line 211 to thereby provide for localised slowing of the scrolling comments approaching the selection marker 401. In one or more examples, the height 406 of the focus area may be substantially equal to the length of the filter line 211. In one or more examples, a boundary of the focus area may be explicitly provided for display or not explicitly provided for display. It will be appreciated that the slowing of the comments may implicitly show the boundary of the focus area 405.

The distance into the first area 214 from the selection marker 401 that the focus area 405 extends may be predetermined, based on the size of the first area 214 or on a quantity or density of the comments provided for display. The height 406 of the focus area 405 may be predetermined, based on the size of the first area 214 or on a quantity or density of the comments provided for display. The degree to which the comment scrolling is reduced may be predetermined, based on the size of the first area 214 or on a quantity or density of the comments provided for display.

In one or more examples, the degree to which the comment filtering rules are applied may be controllable. For example, for a comment filtering rule based on the blocking of an offensive word, a low sensitivity may be filtering only on exact future occurrences of that word e.g. "fool". A higher sensitivity may be filtering based on future occurrences of that word as well as derivatives thereof e.g. "fool", "foolish" and "fools" or semantic analysis of the underlying meaning of the comment. The apparatus may be configured to control the sensitivity of the application of the comment filtering rules based on a determined user-controllable width of the bar 300 associated with the filter line 211. The control of the width of the bar 300 may provide for convenient and screen area effective control of the filtering sensitivity. Further, the width of the bar may provide convenient feedback to a user of the current sensitivity setting. For a touch screen input, the user-controllable width may be provided via a user input that may comprise a pinch/expand gesture received via a multi-touch input interface. In other examples, a scroll wheel of a mouse pointer may be used to control the width of the bar 300 when the bar is selected or hovered over. It will be appreciated that many examples exist for how the width of the bar 300 may be controlled by the user.

The apparatus 100 may be caused to provide for comment filtering based on one or more comment filter rule types. The apparatus 100 may be caused to provide for generation of one or more comment filtering rules based on a user selected mode of one or more modes, the modes determining how the selection of comments or parts thereof by the selection marker 401 are used in the generation of a comment filtering rule.

FIGS. 5, 6, 7 and 8 illustrate the provision of four different comment filtering modes, although more than four or less than four modes may be provided.

In one or more examples the apparatus provides for comment filtering based on comment filtering rules defined by one or more of the following modes;
i) a keyword filtering mode in which at least one or more selected words define a comment filtering rule such that future comments containing said at least one or more words are filtered on meeting the filter line 211;
ii) a commenting-user filtering mode in which each comment is associated with a user account of a user who posted the comment, and wherein a user account of the user who posted the comment selected by the user selection is used to define a comment filtering rule such that future comments posted using the same user account are filtered on meeting the filter line 211;
iii) a semantic filtering in which at least one or more words present in the at least part of a comment selected by the user selection is used to define a comment filtering rule such that future comments containing the same meaning, determined by semantic analysis of the at least one or more words, are filtered on meeting the filter line 211;
iv) a regular expression filtering mode in which based on receipt of user input of an expression, the expression forms part of a comment filtering rule such that future comments identified by regular expression analysis using the expression are filtered on meeting the filter line 211.

In one or more examples, the apparatus may provide for the user-selection of one of the one or more modes to enable generation of comment filtering rules in accordance with said selected mode and a user-selection of a comment or part thereof.

FIGS. 5 to 8 show the provision of a mode selection graphic 500 that shows four modes;
- a) Keyword 501 for the keyword based filtering;
- b) Account 502 for the commenting-user filtering mode;
- c) Regex 503 for the regular expression filtering mode; and
- d) Semantic 504 for the semantic filtering mode.

The description below describes an example of how the modes are selected as well as criteria for use in accordance with the mode for generation of comment filtering rules. It will be appreciated that other means for generating comment filtering rules may be provided, such as a pop-up GUI, speech input or textual input among others.

As shown in FIGS. 5 to 8 on selection of a particular mode, the apparatus provides for display of the bar 300 with a different marking, pattern or colour. This may help distinguish between the modes.

Figure 5:
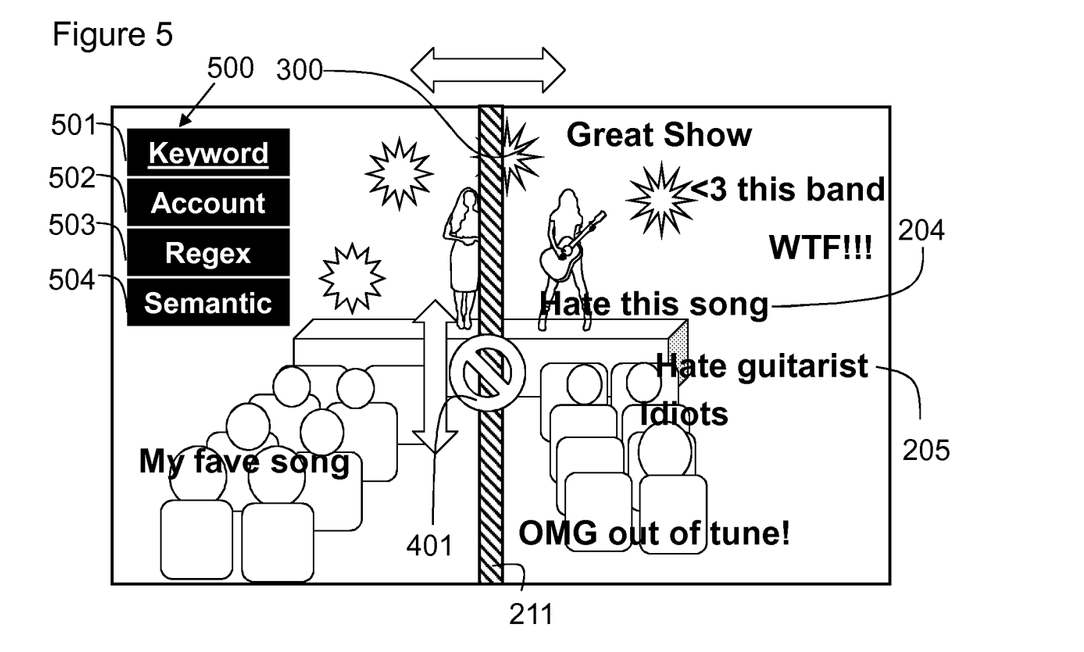
FIG. 5 illustrates a first filtering mode.

In FIG. 5, the user has selected the "keyword" mode. The apparatus 100, based on the selection of the keyword mode, provides for display of the bar 300 with a first patterning (or other visually distinguishing feature). In one or more examples, the mode may be selected using a touch input or the use of the scroll wheel of a mouse or other pointing device while the selection marker 401 is selected.

On user selection of the keyword mode and selection of at least a word from the one or more comments 201-208, the apparatus may provide for generation of a comment filtering rule.

In this example, the apparatus 100 may determine that the user positioned the selection marker 401 such that the word "Hate" of comment 204 was incident with the selection marker 401 and was thus selected. The apparatus may then provide for generation of a comment filtering rule that defines that any future comment containing the word "Hate" will be filtered. Thus, with the keyword mode selected the selection of word is interpreted as being the selection of that word as a keyword upon which to perform keyword filtering.

Thus, with the "hate" keyword filtering rule generated, the apparatus may provide for the removal from display of a fifth comment 205 of the plurality of comments because it contains the keyword "hate", once that comment 205 scrolls to meet the filter line 211 (overlapping with the bar 300 in FIGS. 5-8).

Figure 6:
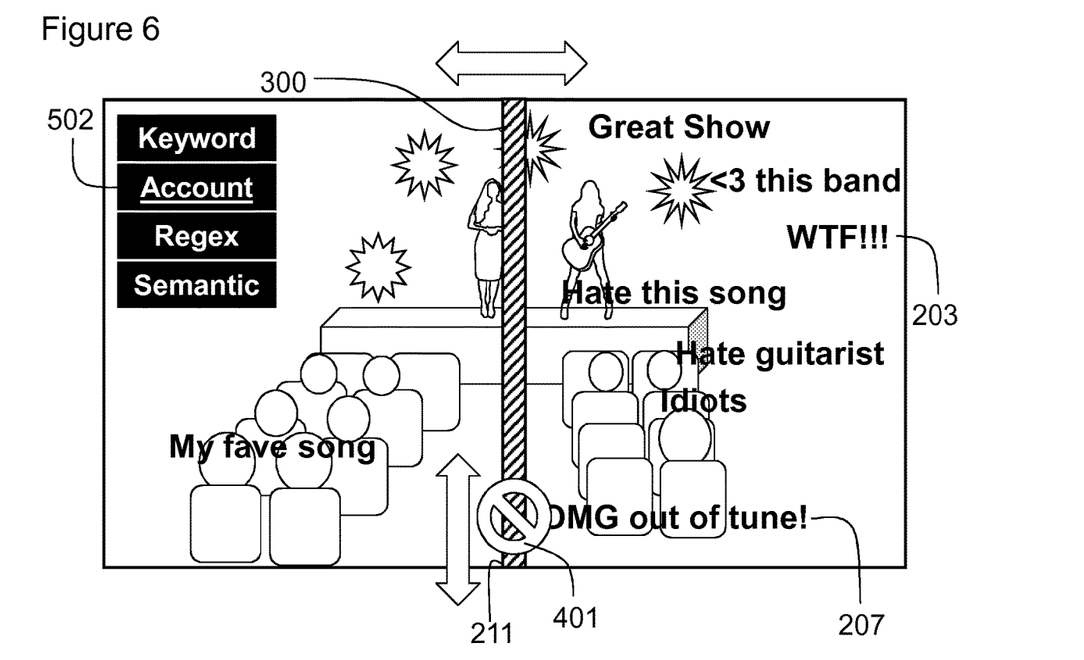
FIG. 6 illustrates a second filtering mode.

Turning to FIG. 6, the user has selected the "Account" mode. The apparatus 100, based on the selection of the account mode, provides for display of the bar 300 with a second patterning (or other visually distinguishing feature). In one or more examples, the mode may be selected using a touch input or the use of the scroll wheel of a mouse or other pointing device while the selection marker 401 is selected.

On user selection of the account mode and selection of at least a part of one or more comments 201-208, the apparatus may provide for generation of a comment filtering rule.

In this example, the apparatus 100 may determine that the user positioned the selection marker 401 such that the comment 207 was incident with the selection marker 401 and was thus selected. The apparatus may then provide for generation of a comment filtering rule that defines that any future comments posted using the user-account used for posting the comment 207 will be filtered. Thus, with the account mode selected the selection of a comment or part thereof is interpreted as being the selection of a user-account associated with that comment such a comment filtering rule is generated to filter comments from the same user-account. In this example, let the selected user account be "user123".

In this example, it happens that the same user-account, "user123", was used to post the comment 207 "OMG out of tune!" and comment 203 "WTF!!!". Thus, with the "user123" user-account filtering rule generated, the apparatus 100 may provide for the removal from display of the selected comment 207 as well as the comment 203 because it was posted from the same user account, once that comment 203 scrolls to meet the filter line 211.

Figure 7:
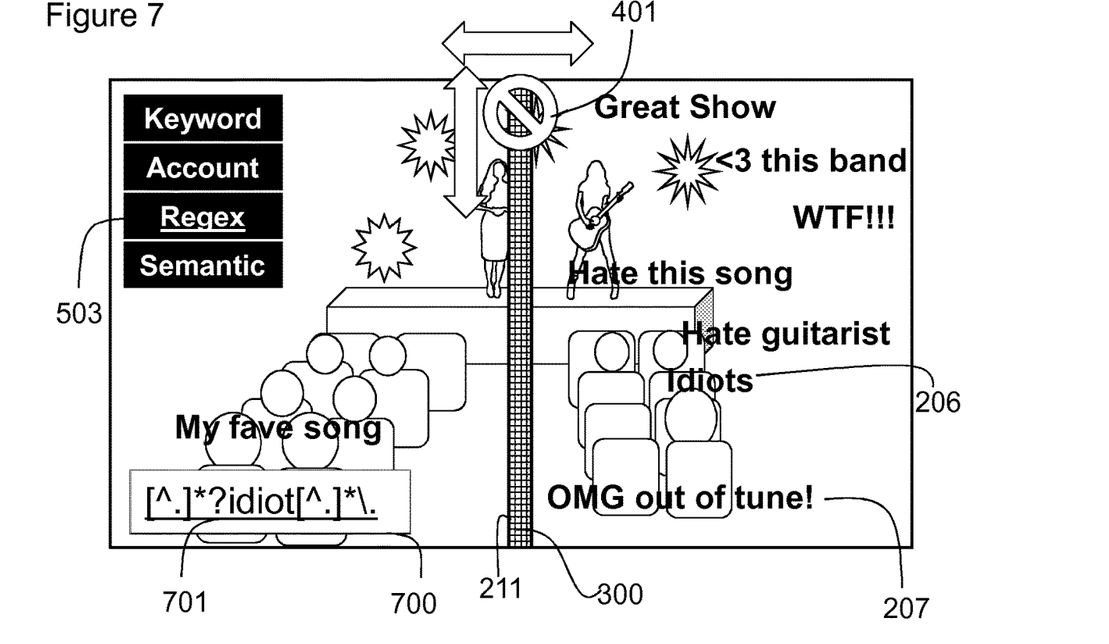
FIG. 7 illustrates a third filtering mode.

Turning to FIG. 7, the user has selected the "Regex" mode 503. The apparatus 100, based on the selection of the regex mode, provides for display of the bar 300 with a third patterning (or other visually distinguishing feature). In one or more examples, the mode may be selected using a touch input or the use of the scroll wheel of a mouse or other pointing device while the selection marker 401 is selected.

On user selection of the regex mode and selection of at least a part of one or more comments 201-208, the apparatus may provide for generation of a comment filtering rule in accordance with the regex mode. The selection of the regex mode 503 may provide for display of a graphic user input field 700 in which a user may enter the regular expression string 701 to be filtered by regular expression filtering. It will be appreciated by those skilled in the art that string 701 provides a sequence of characters that define a search pattern for use in pattern matching with strings, or string matching of future comments.

In this example, the user has entered the regular expression string "idiot". Thus, the apparatus may provide for generation of a regular expression comment filtering rule that uses the user-entered string "idiot" as a search string.

The entering of the string 701 may be provided by a keyboard (physical or virtual), by speech recognition or selection of one or more words of a comment using the selection marker 401.

In this example, the apparatus 100 may determine that the user entered the string "idiots", either by selection of comment 206 with the selection marker 401 such that the comment 206 was incident with the selection marker 401 or by other means. The apparatus 100 may then provide for generation of a comment filtering rule that defines that any future comments matching the regular expression string 701 will be filtered. Thus, with the regex mode selected the entering of a string or selection of a comment or part thereof to form the string is interpreted as being the selection of one or more words for regular expression based filtering such that a corresponding comment filtering rule is generated In this example, none of the other comments shown overlaying in the video 200 happen to satisfy the "idiot" regex comment filtering rule and therefore none of the currently displayed comments will be filtered. However, with the regex filtering rule generated, the apparatus 100 may provide for the removal from display of one or more future comments falling foul of the rule once those comments scrolls to meet the filter line 211.

Figure 8:
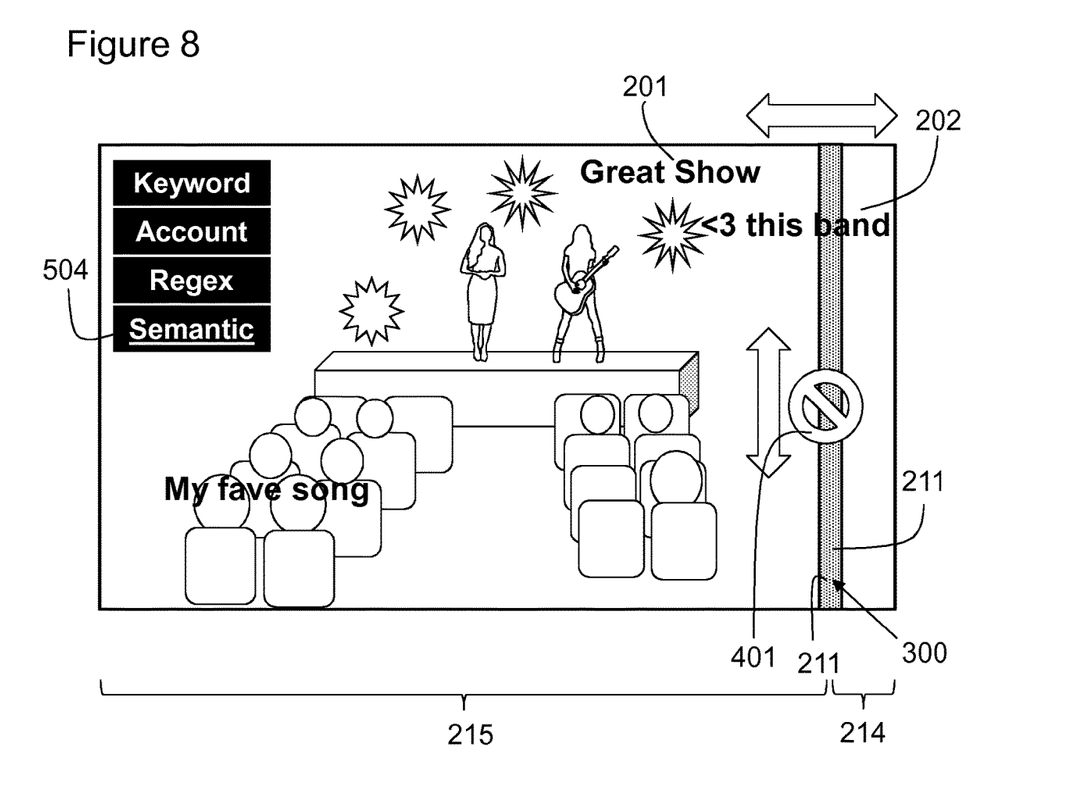
FIG. 8 illustrates a fourth filtering mode.

Turning to FIG. 8, the user has selected the "Semantic" mode 504. The apparatus 100, based on the selection of the semantic mode, provides for display of the bar 300 with a fourth patterning (or other visually distinguishing feature). In one or more examples, the mode may be selected using a touch input or the use of the scroll wheel of a mouse or other pointing device while the selection marker 401 is selected.

On user selection of the semantic mode and selection of at least a part (e.g. one or more words) of one or more comments 201-208 (or by other user input), the apparatus 100 may provide for generation of a comment filtering rule in accordance with the semantic mode, i.e. based on semantic analysis of future comments based on a semantic interpretation of the selected comment or part thereof.

The apparatus 100 may provide for, in the semantic mode and based on the user-selection of the one or more words or comments, semantic analysis of those one or more words or comments for generation of a semantic based comment filtering rule. The semantic analysis may determine a meaning of the one or more words or comments and wherein future comments having the same meaning may be filtered by removal from display on meeting the filter line 211.

The apparatus may provide comments or parts thereof that are not selected by the user for semantic analysis as examples of words that should not be subject to semantic based filtering. Thus, the selection of words or comments to block and, optionally, the provision of words or comments not selected by the user provides for training of a semantic filtering engine that determines if the comment filtering rule is satisfied or not.

In one or more examples, the semantic mode may have two sub-modes, in which in a first sub-mode user-selection of comments or parts thereof provides positive examples of what should be subject to semantic based filtering and in a second sub-mode user-selection of comments or parts thereof provides negative examples of what should not be subject to semantic based filtering. With a semantic based comment filtering rule, the apparatus may provide functionality as a naive bayes classifier and will classify the incoming comments into two classes: positive (filter the comment by removing from display at the filter line) or negative (do not filter the comment and let it pass through the filter line 211).

In one or more examples, the apparatus 100 is caused to provide for filtering of non-filtered comments comprising those that do not satisfy the one or more comment filtering rules.

For example, where there are many comments provided for display, the viewing of or enjoyment of watching the underlying video may be hindered. Thus, while the unfiltered comments may not satisfy any particular comment filtering rule set by the user or others, it may be desirable to remove some of the comments.

The apparatus may provide for removal from display, on reaching the filter line, a user-specified proportion of the comments and, in one or more examples, the unfiltered comments.

In one or more examples, the proportion may be affected by the random selection of a subset of the comments or non-filtered comments in accordance with the user-specified proportion. In one or more examples, the apparatus may provide for ranking of the comments based on the one or more comment filtering rules and the user-specified proportion may be affected by removing from display a corresponding proportion of the comments from an end of a ranked list of the comments provided for display.

FIG. 8 also happens to illustrate the filter line 211 moved by the user to a right hand side such that the second area 215 covers the majority of the video and therefore, potentially the display connected to the apparatus 100. With this arrangement of the filter line 211, the user will be presented with the comments with the filtered comments removed from display.

Figure 9:
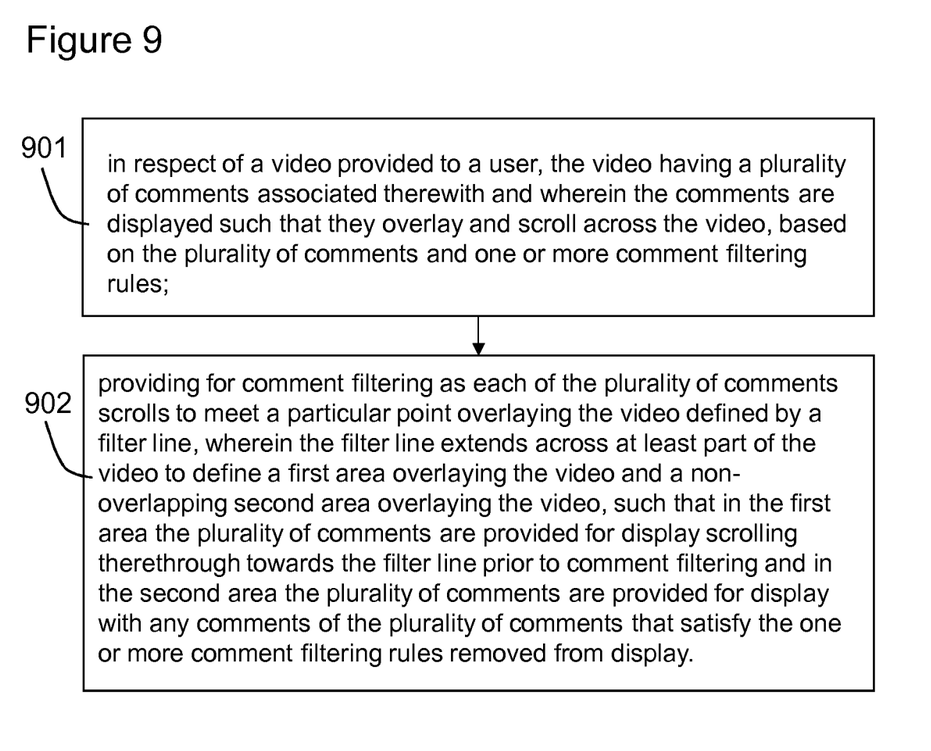
FIG. 9 shows a flowchart illustrating an example method.

FIG. 9 shows a flow diagram illustrating the steps of, in respect of a video provided to a user, the video having a plurality of comments associated therewith and wherein the comments are displayed such that they overlay and scroll across the video, based on 901 the plurality of comments and one or more comment filtering rules; providing for comment filtering 902 as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering and in the second area the plurality of comments are provided for display with any comments of the plurality of comments that satisfy the one or more comment filtering rules removed from display.

Figure 10:
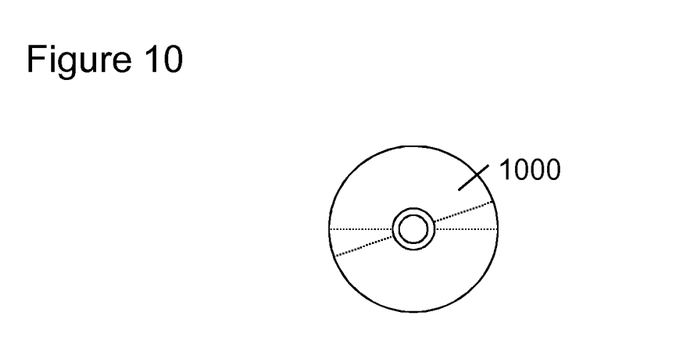
FIG. 10 shows a computer readable medium.

FIG. 10 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform,
   in respect of a video provided to a user, the video having a plurality of comments associated therewith and wherein the comments are displayed such that they overlay and scroll across the video, based on the plurality of comments and one or more comment filtering rules, at least
   providing for comment filtering as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering, the plurality of comments are filtered at the filter line, and in the second area the plurality of comments are provided for display, where any comments, of the plurality of comments, that satisfy the one or more comment filtering rules have been removed from display at the filter line.

2. The apparatus according to claim 1, wherein the filter line is movable by a user such that the particular point overlaying the video at which comment filtering is provided is user-modifiable.

3. The apparatus according to claim 1, wherein the apparatus is caused to provide for display of a visible mark line marking the position of the filter line.

4. The apparatus according to claim 3, wherein the apparatus is caused to provide for removal of the display of the mark line after a predetermined period of time after a last user-interaction with said visible line.

5. The apparatus according to claim 3, wherein the apparatus is caused to provide said comment filtering with a plurality of sensitivities, said sensitivities affecting the degree to which the one or more filtering rules are applied, and wherein the apparatus is caused to provide for feedback to a user on a current sensitivity of the plurality of sensitivities relative to the remaining plurality of sensitivities by virtue of the width of the mark line.

6. The apparatus according to claim 5, wherein the apparatus is caused to provide for control of the sensitivity by providing for receipt of a user input comprising a pinch/expand gesture received via a multi-touch input interface.

7. The apparatus according to claim 1, wherein the apparatus is caused to provide for display of a user-movable selection marker, wherein movement of the selection marker is limited to at least two positions along an extent of the filter line, and wherein user-positioning of the selection marker such that at least part of at least one of the plurality of comments overlaps with the selection marker as the at least one comment scrolls towards the selection marker provides for user selection of said at least part of said comment for determination of the one or more filtering rules.

8. The apparatus according to claim 1, wherein the apparatus is caused to provide for a reduction of a speed at which the comments scroll in a predefined focus area, the predefined focus area extending from the filter line into the first area around the selection marker, the focus area having a width, the width extending in the direction of the filter line, less than the length of the filter line to thereby provide for localised slowing of scrolling comments approaching the selection marker.

9. The apparatus according to claim 1, wherein the apparatus is caused to provide for a plurality of filtering modes and for user selection of one of the filtering modes and for user selection of at least part of one or more of said comments wherein based on a selected comment or part thereof and a current, selected, filtering mode, and wherein the apparatus is caused to provide for generation of a filtering rule in accordance with the currently selected filtering mode.

10. The apparatus according to claim 9, wherein based on a current filtering mode, at least the mark line is displayed with an appearance unique to the current filtering mode relative to the plurality of filtering modes.

11. The apparatus according to claim 9, wherein the filtering modes comprise at least one:
   i) keyword filtering mode in which at least one or more selected words define a comment filtering rule such that future comments containing said at least one or more words are filtered on meeting the filter line;
   ii) commenting-user filtering mode in which each comment is associated with a user account of a user who posted the comment, and wherein a user account of the user who posted the comment selected by the user selection is used to define a comment filtering rule such that future comments posted using the same user account are filtered on meeting the filter line;
   iii) semantic filtering in which at least one or more words present in the at least part of a comment selected by the user selection is used to define a comment filtering rule such that future comments containing the same meaning, determined by semantic analysis of the at least one or more words, are filtered on meeting the filter line;
   iv) regular expression filtering mode in which based on receipt of user input of an expression, the expression forms part of a comment filtering rule such that future comments identified by regular expression analysis using the expression are filtered on meeting the filter line.

12. The apparatus according to claim 1, wherein the apparatus is caused to provide for receipt of user input of an expression, the expression forming part of a comment filtering rule such that future comments identified by regular expression analysis using the expression are filtered on meeting the filter line.

13. The apparatus according to claim 1, wherein the apparatus is caused to provide for further filtering of non-filtered comments comprising those that do not satisfy the one or more comment filtering rules and would not be removed from display in accordance with the one or more filtering rules, wherein the further filtering is based on a user-specified proportion of the comments, the user-specified proportion providing for one or more of;
   i) random selection of a subset of the non-filtered comments in accordance with the user-specified proportion;
   ii) selection of a consecutive set of the non-filtered comments in accordance with the user-specified proportion, the non-filtered comments ranked according to predefined criteria.

14. A method, comprising:
   in respect of a video provided to a user, the video having a plurality of comments associated therewith and wherein the comments are displayed such that they overlay and scroll across the video, based on the plurality of comments and one or more comment filtering rules,
   providing for comment filtering as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering, the plurality of comments are filtered at the filter line, and in the second area the plurality of comments are provided for display, where any comments, of the plurality of comments, that satisfy the one or more comment filtering rules have been removed from display at the filter line.

15. The method according to claim 14, wherein the filter line is movable by a user such that the particular point overlaying the video at which comment filtering is provided is user-modifiable.

16. The method according to claim 14, further comprising providing for display of a visible mark line marking the position of the filter line.

17. The method according to claim 16, further comprising providing for removal of the display of the mark line after a predetermined period of time after a last user-interaction with said visible line.

18. The method according to claim 14, further comprising providing for display of a user-movable selection marker, wherein movement of the selection marker is limited to at least two positions along an extent of the filter line, and wherein user-positioning of the selection marker such that at least part of at least one of the plurality of comments overlaps with the selection marker as the at least one comment scrolls towards the selection marker provides for user selection of said at least part of said comment for determination of the one or more filtering rules.

19. The method according to claim 14, further comprising providing for a reduction of a speed at which the comments scroll in a predefined focus area, the predefined focus area extending from the filter line into the first area around the selection marker, the focus area having a width, the width extending in the direction of the filter line, less than the length of the filter line to thereby provide for localised slowing of scrolling comments approaching the selection marker.

20. A non-transitory computer readable medium comprising computer program code stored thereon, the computer readable medium and computer program code being configured to, when run on at least one processor, perform, in respect of a video provided to a user, the video having a plurality of comments associated therewith and wherein the comments are displayed such that they overlay and scroll across the video, based on the plurality of comments and one or more comment filtering rules, at least
   providing for comment filtering as each of the plurality of comments scrolls to meet a particular point overlaying the video defined by a filter line, wherein the filter line extends across at least part of the video to define a first area overlaying the video and a non-overlapping second area overlaying the video, such that in the first area the plurality of comments are provided for display scrolling therethrough towards the filter line prior to comment filtering, the plurality of comments are filtered at the filter line, and in the second area the plurality of comments are provided for display, where any comments, of the plurality of comments, that satisfy the one or more comment filtering rules have been removed from display at the filtering line.

\* \* \* \* \*